United States Patent
Wagle et al.

(10) Patent No.: US 9,840,652 B2
(45) Date of Patent: Dec. 12, 2017

(54) WATER-BASED DRILLING FLUID WITH CYCLODEXTRIN SHALE STABILIZER

(71) Applicant: Halliburton Energy Services, Inc., Houston, TX (US)

(72) Inventors: Vikrant Bhavanishankar Wagle, Mumbai (IN); Dhanashree Gajanan Kulkarni, Pune (IN); Ramesh Muthusamy, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/992,596

(22) Filed: Jan. 11, 2016

(65) Prior Publication Data

US 2016/0122615 A1    May 5, 2016

Related U.S. Application Data

(62) Division of application No. 13/670,636, filed on Nov. 7, 2012, now Pat. No. 9,267,069.

(51) Int. Cl.
| | |
|---|---|
| *C09K 8/08* | (2006.01) |
| *C09K 8/10* | (2006.01) |
| *C09K 8/12* | (2006.01) |
| *C09K 8/575* | (2006.01) |
| *C09K 8/03* | (2006.01) |

(52) U.S. Cl.
CPC ............. *C09K 8/10* (2013.01); *C09K 8/032* (2013.01); *C09K 8/08* (2013.01); *C09K 8/12* (2013.01); *C09K 8/5758* (2013.01); *C09K 2208/12* (2013.01)

(58) Field of Classification Search
CPC ... C09K 8/08; C09K 8/10; C09K 8/12; C09K 8/5758; C09K 8/032; C09K 2208/12
USPC .......................................................... 507/111
See application file for complete search history.

(56) References Cited

U.S. PATENT DOCUMENTS

| | | |
|---|---|---|
| 4,561,985 A | 12/1985 | Glass, Jr. |
| 5,496,479 A | 3/1996 | Videau et al. |
| 5,866,517 A | 2/1999 | Carpenter et al. |
| 7,563,750 B2 | 7/2009 | Eoff et al. |
| 7,741,401 B2 | 6/2010 | Harris et al. |
| 8,114,818 B2 | 2/2012 | Reddy et al. |
| 2006/0003899 A1 | 1/2006 | Levey et al. |
| 2009/0181866 A1 | 7/2009 | Reddy et al. |
| 2011/0220358 A1 | 9/2011 | Robinson et al. |

(Continued)

OTHER PUBLICATIONS

International Preliminary Report on Patentability issued in related PCT Application No. PCT/US2013/068395, mailed May 21, 2015 (8 pages).

(Continued)

Primary Examiner — Frances Tischler
(74) Attorney, Agent, or Firm — Tenley Krueger; Baker Botts L.L.P.

(57) ABSTRACT

Well fluids and methods are provided that can be used for stabilizing a shale formation, especially during drilling of a well into or through a shale formation. The well fluids include: (i) a continuous water phase; (ii) a viscosity-increasing agent, wherein the viscosity-increasing agent comprises water-soluble hydrophilic polymer; (iii) a fluid loss control agent; and (iv) a cyclodextrin-based compound. The methods of drilling include the steps of: (A) introducing the well fluid into a zone of a subterranean formation; and (b) drilling the zone.

19 Claims, 1 Drawing Sheet

β –CYCLODEXTRIN AND ITS HYDROXYPROPYL DERIVATIVE

(56) References Cited

U.S. PATENT DOCUMENTS

2012/0111564 A1   5/2012   Reddy et al.

OTHER PUBLICATIONS

International Search Report and Written Opinion issued in related PCT Application No. PCT/US2013/068395, mailed Dec. 27, 2013 (9 pages).
Liu, Xiangjun, et al., "Synthesis and Clay Stabilization of a Water-Soluble Co Polymer Based on Acrylamide, Modular b-Cyclodextrin, and AMPS", Journal of Applied Polymer Science, Sep. 25, 2012, vol. 128, pp. 3398-3404.
Habibi, Youssef et al., "Cellulose Nanocrystals: Chemistry, Self-Assembly, and Applications", Chemical Reviews (2010), vol. 110, No. 6, pp. 3479-3500.
Nandi, Indranil, et al. "Synergistic effect of PEG-400 and cyclodextrin to enhance solubility of progesterone." AAPS PharmSciTech 4.1 (2003): 1-5.

β —CYCLODEXTRIN AND ITS HYDROXYPROPYL DERIVATIVE

WATER-BASED DRILLING FLUID WITH CYCLODEXTRIN SHALE STABILIZER

CROSS-REFERENCE TO RELATED APPLICATIONS

This application claims priority to and is a divisional application of U.S. application Ser. No. 13/670,636 filed on Nov. 7, 2012 entitled "Water-Based Drilling Fluid with Cyclodextrin Shale Stabilizer," the entire disclosure of which is incorporated by reference.

TECHNICAL FIELD

The inventions are in the field of producing crude oil or natural gas from subterranean formations. More specifically, the inventions generally relate to methods of drilling a well.

BACKGROUND

To produce oil or gas, a well is drilled into a subterranean formation that is an oil or gas reservoir.

Drilling is the process of drilling the wellbore of a well. After a portion of the wellbore is drilled, sections of steel pipe, referred to as casing, which are slightly smaller in diameter than the borehole, are placed and cemented in at least the uppermost portions of the wellbore. After drilling, the casing provides structural integrity to the newly drilled borehole. The wellbore is then completed for production of oil or gas.

The well is created by drilling a hole into the earth (or seabed) with a drilling rig that rotates a drill string with a drilling bit attached to the downward end. Usually the borehole is anywhere between about 5 inches (13 cm) to about 36 inches (91 cm) in diameter. As upper portions are cased or lined, progressively smaller drilling strings and bits must be used to pass through the uphole casings or liners, which steps the borehole down to progressively smaller diameters.

While drilling an oil or gas well, a drilling fluid is circulated downhole through a drillpipe to a drill bit at the downhole end, out through the drill bit into the wellbore, and then back uphole to the surface through the annular path between the tubular drillpipe and the borehole. The purpose of the drilling fluid is to lubricate the drill string, maintain hydrostatic pressure in the wellbore, and carry rock cuttings out from the wellbore.

The drilling fluid can be water-based or oil-based. Oil-based fluids tend to have better lubricating properties than water-based fluids, nevertheless, other factors can mitigate in favor of using a water-based drilling fluid.

An example a water-based drilling fluid is a drilling mud, which can include an aqueous solution and undissolved solids (as solid suspensions). A water-based drilling mud can be based on a brine. The dissolved solids and the undissolved solids can be chosen to help increase the density of the drilling fluid. An example of an undissolved weighting agent is barite (barium sulfate). The density of a drilling mud can be much higher than that of typical seawater or even higher than high-density brines due to the presence of suspended solids.

In drilling, subterranean formations including clay can be encountered. Certain clays, such as montmorillonite, have the tendency to swell when exposed to water, creating a potential drilling hazard when clay-bearing rock formations are exposed to water-based fluids during drilling. Such clay is unstable and exposure to water in a drilling fluid can pose problems such as hydration, solvation, and dispersion of the clay. This instability of the clay can cause erosion and destroy the rock formation. The eroding of swelled clay particulate complicates downhole drilling fluid behavior. In addition, the swelling of clay particles in the formation can reduce or plug the permeability of a reservoir rock.

SUMMARY OF THE INVENTION

Well fluids and methods are provided that can be used for stabilizing a shale formation during drilling of a well.

The well fluids include: (i) a continuous water phase; (ii) a viscosity-increasing agent, wherein the viscosity-increasing agent comprises water-soluble hydrophilic polymer; (iii) a fluid loss control agent; and (iv) a cyclodextrin-based compound.

The methods of drilling include the steps of: (A) introducing a well fluid according to the invention into a zone of a subterranean formation; and (b) drilling the zone.

In an embodiment, the zone penetrates or is in a subterranean formation of shale.

In another embodiment, the viscosity-increasing agent includes a water-soluble hydrophilic polymer.

These and other aspects of the invention and sub-combinations will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention. It should be understood that the figures of the drawing are not necessarily to scale.

DETAILED DESCRIPTION OF PRESENTLY PREFERRED EMBODIMENTS AND BEST MODE

Definitions and Usages

Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, however, oil and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

In geology, rock or stone is a naturally occurring solid aggregate of minerals or mineraloids. The Earth's outer solid layer, the lithosphere, is made of rock. Three majors groups of rocks are defined: igneous, sedimentary, and metamorphic.

A subterranean formation having a sufficient porosity and permeability to store and transmit fluids is sometimes referred to as a "reservoir." The vast majority of reservoir rocks are sedimentary rocks, but highly fractured igneous and metamorphic rocks sometimes contain substantial reservoirs as well.

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Clay, Shale, and Shale Formations

The structural difference among clays (smectite, kaolinite, chlorite, illite) determines the surface area exposed to reservoir fluids or stimulating fluids. Generally, higher surface area indicates higher reactivity. However, not all the clay present in a rock is reactive.

Clays can be found in pore spaces, as part of the rock matrix, or as grain-cementing material. Antigenic clays, which grow in the pores from minerals in the connate water, can be pore-filling or pore-lining. These clays have considerable surface area exposed in the pore and can be reactive, while detrital clays that are part of the matrix are usually less reactive.

Shale is a fine-grained, fissile, detrital sedimentary rock formed by consolidation of clay-sized and silt-sized particles into thin, relatively impermeable layers. Shale is formed from a mix of flakes of clay minerals and tiny fragments (silt-sized particles) of other minerals, especially quartz and calcite. The ratio of clay to other minerals is variable. Detritus is a geological term used to describe particles of rock derived from pre-existing rock through processes of weathering and erosion. Detrital particles can consist of lithic fragments (particles of recognizable rock) or of monomineralic fragments (mineral grains). These particles are often transported through sedimentary processes into depositional systems such as riverbeds, lakes or the ocean forming sedimentary successions. Shale is characterized by breaks along thin laminae or parallel layering or bedding less than one centimeter in thickness, called fissility.

A shale formation is a subterranean formation of shale. It is the most abundant sedimentary rock.

Conventional Reservoirs

There are conventional and non-conventional types of reservoirs.

In a conventional reservoir, the hydrocarbons flow to the wellbore in a manner that can be characterized by flow through permeable media, where the permeability may or may not have been altered near the wellbore, or flow through permeable media to a permeable (conductive) bi-wing fracture placed in the formation. A conventional reservoir would typically have a matrix permeability greater than about 1 milliDarcy (equivalent to about 1,000 microDarcy).

A conventional reservoir is usually in a shape that will trap hydrocarbons and that is covered by a relatively impermeable rock, known as cap rock. The cap rock forms a barrier above reservoir rock so that fluids cannot migrate beyond the reservoir. A cap rock capable of being a barrier to fluid migration on a geological time scale has a permeability that is less than about 1 microDarcy. Cap rock is commonly salt, anhydrite, or shale.

In addition, the hydrocarbons located in the reservoir are located vertically based on their density where the movement of one of the reservoir fluid can apply a driving force to another reservoir fluid. Most conventional reservoir rocks are limestone, dolomite, sandstone, or a combination of these.

Non-Conventional Reservoirs

In a non-conventional reservoir, the permeability is less than 1 milliDarcy. Non-conventional reservoirs include tight gas and shale.

Tight gas is natural gas that is difficult to access because the matrix permeability is relatively low. Generally, tight gas is in a subterranean formation having a matrix permeability in the range of about 1 milliDarcy to about 0.01 milliDarcy (equivalent to about 10 microDarcy). Conventionally, to produce tight gas it is necessary to find a "sweet spot" where a large amount of gas is accessible, and sometimes to use various means to create a reduced pressure in the well to help draw the gas out of the formation.

Shale, which is conventionally considered to be a cap rock, can include relatively large amounts of organic material compared with other types of rock. Gas is very difficult to produce from shale, however, because the matrix permeability of the shale is often less than about 1 microDarcy.

Well Terms

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or well fluids can be directed from the wellhead into any desired portion of the wellbore.

As used herein, the word "tubular" means any kind of body in the general form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples that illustrate some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an annulus is a space through which a fluid can flow.

As used herein, a "well fluid" broadly refers to any fluid adapted to be introduced into a well for any purpose. A well fluid can be, for example, a drilling fluid, a cementing composition, a treatment fluid, or a spacer fluid. If a well fluid is to be used in a relatively small volume, for example less than about 200 barrels (about 8,400 US gallons or about 32 m$^3$) it is sometimes referred to as a wash, dump, slug, or pill.

Drilling fluids, also known as drilling muds or simply "muds," are typically classified according to their base fluid, that is, the nature of the continuous phase. A water-based mud ("WBM") has a water phase as the continuous phase. The water can be brine. A brine-based drilling fluid is a water-based mud in which the aqueous component is brine. In some cases, oil may be emulsified in a water-based drilling mud. An oil-based mud ("OBM") has an oil phase as the continuous phase. In some cases, a water phase is emulsified in the oil-based mud.

As used herein, the word "treatment" refers to any treatment for changing a condition of a portion of a wellbore or an adjacent subterranean formation; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular well fluid or stage of a well service. For example, a fluid can be designed to have components that provide a minimum viscosity for at least a specified time under expected downhole conditions. A well service may include design parameters such as fluid volume to be pumped, required pumping time, or the shear conditions of the pumping.

The term "design temperature" refers to an estimate or measurement of the actual temperature at the downhole environment at the time of a well operation. That is, design temperature takes into account not only the bottom hole static temperature ("BHST") but also the effect of the temperature of the well fluid on the BHST during the operation. The design temperature is sometimes referred to as the bottom hole circulation temperature ("BHCT") Because well fluids may be considerably cooler than BHST, the difference between the two temperatures can be quite large. Ultimately, if left undisturbed, a subterranean formation will return to the BHST.

Substances, Chemicals, and Derivatives

A substance can be a pure chemical or a mixture of two or more different chemicals.

A pure chemical is a sample of matter that cannot be separated into simpler components without chemical change. A chemical element is composed of atoms with identical atomic number. A chemical compound is formed from different elements chemically combined in definite proportions by mass.

An atom or molecule is the smallest particle of a chemical that retains the chemical properties of the element or compound. A molecule is two or more chemically bound atoms with characteristic composition and structure. Making or breaking bonds in a molecule changes it to a different chemical.

As used herein, "modified" or "derivative" means a compound or substance formed by a chemical process from a parent compound or substance, wherein the chemical backbone skeleton of the parent polymer is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction) An example of a chemical step is a substitution reaction. Substitution on the reactive sites of a polymeric material may be partial or complete.

Physical States and Phases

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particle Terms

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, "particulate" or "particulate material" refers to matter in the physical form of distinct particles in a solid or liquid state (which means such an association of a few atoms or molecules) unless the context otherwise requires. As used herein, a particulate is a grouping of particles having similar chemical composition and particle size ranges anywhere in the range of about 0.5 micrometer (500 nm) e.g., microscopic clay or silt particles, to about 3 millimeters, e.g., large grains of sand).

A particulate can be of solid or liquid particles. As used herein, however, unless the context otherwise requires, "particulate" refers to a solid particulate. Of course, a solid particulate is a particulate of particles that are in the solid physical state, that is, the constituent atoms, ions, or molecules are sufficiently restricted in their relative movement to result in a fixed shape for each of the particles.

It should be understood that the terms "particle" and "particulate," includes all known shapes of particles including substantially rounded, spherical, oblong, ellipsoid, rod-like, fiber, polyhedral (such as cubic materials) etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

A particulate will have a particle size distribution ("PSD") As used herein, "the size" of a particulate can be determined by methods known to persons skilled in the art.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh) This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size refers to about the mid-point of the industry-accepted mesh size range for the particulate.

The most commonly-used grade scale for classifying the diameters of sediments in geology is the Udden-Wentworth scale. According to this scale, a solid particulate having particles smaller than 2 mm in diameter is classified as sand, silt, or clay. "Sand" is a detrital grain between 2 mm (equivalent to 2,000 micrometers) and 0.0625 mm (equivalent to 62.5 micrometers) in diameter. (Sand is also a term sometimes used to refer to quartz grains or for sandstone.) "Silt" refers to particulate between 74 micrometers (equivalent to about −200 U.S. Standard mesh) and about 2 micrometers. "Clay" is a particulate smaller than 3.9 micrometers.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified different ways, including, for example, based on the size of the dispersed particles, the uniformity or lack of uniformity of the dispersion, and, if a fluid, whether or not precipitation occurs.

A dispersion is considered to be heterogeneous if the dispersed particles are not dissolved and are greater than about 1 nanometer in size. (For reference, the diameter of a molecule of toluene is about 1 nm and a molecule of water is about 0.3 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

Heterogeneous dispersions can be further classified based on the dispersed particle size.

A heterogeneous dispersion is a "suspension" where the dispersed particles are larger than about 50 micrometers. Such particles can be seen with a microscope, or if larger than about 50 micrometers (0.05 mm) with the unaided human eye. The dispersed particles of a suspension in a liquid external phase may eventually separate on standing, e.g., settle in cases where the particles have a higher density than the liquid phase. Suspensions having a liquid external phase are essentially unstable from a thermodynamic point of view; however, they can be kinetically stable over a long period depending on temperature and other conditions.

A heterogeneous dispersion is a "colloid" where the dispersed particles range up to about 50 micrometer (50,000 nanometers) in size. The dispersed particles of a colloid are so small that they settle extremely slowly, if ever. In some cases, a colloid can be considered as a homogeneous mixture. This is because the distinction between "dissolved" and "particulate" matter can be sometimes a matter of theoretical approach, which affects whether or not it is considered homogeneous or heterogeneous.

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

Solubility Terms

A substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A "gas" (in the sense of a physical state) refers to an amorphous substance that has a high tendency to disperse (at the molecular level) and a relatively high compressibility. A "liquid" refers to an amorphous substance that has little tendency to disperse (at the molecular level) and relatively high incompressibility. The tendency to disperse is related to Intermolecular Forces (also known as van der Waal's Forces) (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

As used herein, a fluid is a substance that behaves as a fluid under Standard Laboratory Conditions, that is, at 77° F. (25° C.) temperature and 1 atmosphere pressure, and at the higher temperatures and pressures usually occurring in subterranean formations without applied shear.

Every fluid inherently has at least a continuous phase. A fluid can have more than one phase. The continuous phase of a well fluid is a liquid under Standard Laboratory Conditions. For example, a well fluid can be in the form of be a suspension (solid particles dispersed in a liquid phase) an emulsion (liquid particles dispersed in another liquid phase) or a foam (a gas phase dispersed in a liquid phase).

As used herein, "water-based" means that water or an aqueous solution is the dominant material of the continuous phase, that is, greater than 50% by weight, of the continuous phase of the fluid.

In contrast, "oil-based" means that oil is the dominant material by weight of the continuous phase of the fluid. In this context, the oil of an oil-based fluid can be any oil.

In the context of a well fluid, oil is understood to refer to an oil liquid, whereas gas is understood to refer to a physical state of a substance, in contrast to a liquid. In general, an oil is any substance that is liquid under Standard Laboratory Conditions, is hydrophobic, and soluble in organic solvents. Oils have a high carbon and hydrogen content and are relatively non-polar substances, for example, having a polarity of 3 or less on the Snyder polarity index. This general definition includes classes such as petrochemical oils, vegetable oils, and many organic solvents. All oils can be traced back to organic sources.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary the flow speed must equal that of the fluid. The region between these two points is aptly named the boundary layer. For all Newtonian fluids in laminar flow, the shear stress is proportional to the strain rate in the fluid where the viscosity is the constant of proportionality. However for non-Newtonian fluids, this is no longer the case as for these fluids the viscosity is not constant. The shear stress is imparted onto the boundary as a result of this loss of velocity.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant sear rate. A Bingham plastic is a material that behaves as a solid at low stresses but flows as a viscous fluid at high stresses.

Most well fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of centipoise ("cP").

Like other physical properties, the viscosity of a Newtonian fluid or the apparent viscosity of a non-Newtonian fluid may be highly dependent on the physical conditions, primarily temperature and pressure.

Gels and Deformation

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or 50 viscometer or a CHANDLER™ model 5550 HPHT viscometer, which measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron) would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

Unless otherwise specified, the apparent viscosity of a fluid (excluding any suspended solid particulate larger than silt) is measured with a Fann Model 50 type viscometer using an R1 rotor, B1 bob, and F1 torsion spring at a shear rate of 40 1/s, and at a temperature of 77° F. (25° C.) and a pressure of 1 atmosphere. For reference, the viscosity of pure water is about 1 cP.

A substance is considered to be a fluid if it has an apparent viscosity less than 5,000 cP (independent of any gel characteristic).

As used herein, a fluid is considered to be "viscous" if it has an apparent viscosity of 10 cP or higher. The viscosity of a viscous fluid is considered to break or be broken if the viscosity is greatly reduced. Preferably, although not necessarily for all applications depending on how high the initial viscosity of the fluid, the viscous fluid breaks to a viscosity of 5 cP or lower.

Emulsions

An emulsion is a fluid including a dispersion of immiscible liquid particles in an external liquid phase. In addition, the proportion of the external and internal phases is above the solubility of either in the other. A chemical can be included to reduce the interfacial tension between the two immiscible liquids to help with stability against coalescing of the internal liquid phase, in which case the chemical may be referred to as a surfactant or more particularly as an emulsifier or emulsifying agent.

In the context of an emulsion, a "water phase" refers to a phase of water or an aqueous solution and an "oil phase" refers to a phase of any non-polar, organic liquid that is immiscible with water, usually an oil.

An emulsion can be an oil-in-water (o/w) type or water-in-oil (w/o) type. A water-in-oil emulsion is sometimes referred to as an invert emulsion.

Biodegradability

"Biodegradable" means the process by which complex molecules are broken down by micro-organisms to produce simpler compounds. Biodegradation can be either aerobic (with oxygen) or anaerobic (without oxygen) The potential for biodegradation is commonly measured on well fluids or their components to ensure that they do not persist in the environment. A variety of tests exist to assess biodegradation.

As used herein, a substance is considered "biodegradable" if the substance passes a ready biodegradability test or an inherent biodegradability test. It is preferred that a substance is first tested for ready biodegradability, and only if the substance does not pass at least one of the ready biodegradability tests then the substance is tested for inherent biodegradability.

In accordance with Organisation for Economic Co-operation and Development (OECD) guidelines, the following six tests permit the screening of chemicals for ready biodegradability. As used herein, a substance showing more than 60% biodegradability in 28 days according to any one of the six ready biodegradability tests is considered a pass level for classifying it as "readily biodegradable," and it may be assumed that the substance will undergo rapid and ultimate degradation in the environment. The six ready biodegradability tests are: (1) 301A: DOC Die-Away; (2) 301B: CO2 Evolution (Modified Sturm Test) (3) 301C: MITI (I) (Ministry of International Trade and Industry, Japan) (4) 301D: Closed Bottle; (5) 301E: Modified OECD Screening; and (6) 301F: Manometric Respirometry. The six ready biodegradability tests are described below:

For the 301A test, a measured volume of inoculated mineral medium, containing 10 mg to 40 mg dissolved organic carbon per liter (DOC/l) from the substance as the nominal sole source of organic carbon, is aerated in the dark or diffuse light at 22±2° C. Degradation is followed by DOC analysis at frequent intervals over a 28-day period. The degree of biodegradation is calculated by expressing the concentration of DOC removed (corrected for that in the blank inoculum control) as a percentage of the concentration initially present. Primary biodegradation may also be calculated from supplemental chemical analysis for parent compound made at the beginning and end of incubation.

For the 301B test, a measured volume of inoculated mineral medium, containing 10 mg to 20 mg DOC or total organic carbon per liter from the substance as the nominal sole source of organic carbon is aerated by the passage of carbon dioxide-free air at a controlled rate in the dark or in diffuse light. Degradation is followed over 28 days by determining the carbon dioxide produced. The $CO_2$ is trapped in barium or sodium hydroxide and is measured by titration of the residual hydroxide or as inorganic carbon. The amount of carbon dioxide produced from the test substance (corrected for that derived from the blank inoculum) is expressed as a percentage of $ThCO_2$. The degree of biodegradation may also be calculated from supplemental DOC analysis made at the beginning and end of incubation.

For the 301C test, the oxygen uptake by a stirred solution, or suspension, of the substance in a mineral medium, inoculated with specially grown, unadapted micro-organisms, is measured automatically over a period of 28 days in a darkened, enclosed respirometer at 25+/−1° C. Evolved carbon dioxide is absorbed by soda lime. Biodegradation is expressed as the percentage oxygen uptake (corrected for blank uptake) of the theoretical uptake (ThOD) The percentage primary biodegradation is also calculated from supplemental specific chemical analysis made at the beginning and end of incubation, and optionally ultimate biodegradation by DOC analysis.

For the 301D test, a solution of the substance in mineral medium, usually at 2-5 milligrams per liter (mg/l) is inoculated with a relatively small number of micro-organisms from a mixed population and kept in completely full, closed bottles in the dark at constant temperature. Degradation is followed by analysis of dissolved oxygen over a 28 day period. The amount of oxygen taken up by the microbial population during biodegradation of the test substance, corrected for uptake by the blank inoculum run in parallel, is expressed as a percentage of ThOD or, less satisfactorily COD.

For the 301E test, a measured volume of mineral medium containing 10 to 40 mg DOC/l of the substance as the nominal sole source of organic carbon is inoculated with 0.5 ml effluent per liter of medium. The mixture is aerated in the dark or diffused light at 22+2° C. Degradation is followed by DOC analysis at frequent intervals over a 28 day period. The degree of biodegradation is calculated by expressing the concentration of DOC removed (corrected for that in the blank inoculums control) as a percentage of the concentration initially present. Primary biodegradation may also be calculated from supplemental chemical analysis for the parent compound made at the beginning and end of incubation.

For the 301F test, a measured volume of inoculated mineral medium, containing 100 mg of the substance per liter giving at least 50 to 100 mg ThOD/l as the nominal sole source of organic carbon, is stirred in a closed flask at a constant temperature (±1° C. or closer) for up to 28 days. The consumption of oxygen is determined either by measuring the quantity of oxygen (produced electrolytically) required to maintain constant gas volume in the respirometer flask or from the change in volume or pressure (or a combination of the two) in the apparatus. Evolved carbon dioxide is absorbed in a solution of potassium hydroxide or another suitable absorbent. The amount of oxygen taken up by the microbial population during biodegradation of the test substance (corrected for uptake by blank inoculum, run in parallel) is expressed as a percentage of ThOD or, less satisfactorily, COD. Optionally, primary biodegradation may also be calculated from supplemental specific chemical analysis made at the beginning and end of incubation, and ultimate biodegradation by DOC analysis.

In accordance with OECD guidelines, the following three tests permit the testing of chemicals for inherent biodegradability. As used herein, a substance with a biodegradation or biodegradation rate of >20% is regarded as "inherently primary biodegradable." A substance with a biodegradation or biodegradation rate of >70% is regarded as "inherently ultimate biodegradable." As used herein, a substance passes the inherent biodegradability test if the substance is either regarded as inherently primary biodegradable or inherently ultimate biodegradable when tested according to any one of three inherent biodegradability tests. The three tests are: (1) 302A: 1981 Modified SCAS Test; (2) 302B: 1992 Zahn-Wellens Test; and (3) 302C: 1981 Modified MITI Test. "Inherent biodegradability" refers to tests which allow prolonged exposure of the test compound to microorganisms, a more favorable test compound to biomass ratio, and chemical or other conditions which favor biodegradation. The three inherent biodegradability tests are described below:

For the 302A test, activated sludge from a sewage treatment plant is placed in an aeration (SCAS) unit. The substance and settled domestic sewage are added, and the mixture is aerated for 23 hours. The aeration is then stopped, the sludge allowed to settle and the supernatant liquor is removed. The sludge remaining in the aeration chamber is then mixed with a further aliquot of the substance and sewage and the cycle is repeated. Biodegradation is established by determination of the dissolved organic carbon content of the supernatant liquor. This value is compared with that found for the liquor obtained from a control tube dosed with settled sewage only.

For the 302B test, a mixture containing the substance, mineral nutrients, and a relatively large amount of activated sludge in aqueous medium is agitated and aerated at 20° C. to 25° C. in the dark or in diffuse light for up to 28 days. A blank control, containing activated sludge and mineral nutrients but no substance, is run in parallel. The biodegradation process is monitored by determination of DOC (or COD) in filtered samples taken at daily or other time intervals. The ratio of eliminated DOC (or COD) corrected for the blank, after each time interval, to the initial DOC value is expressed as the percentage biodegradation at the sampling time. The percentage biodegradation is plotted against time to give the biodegradation curve.

For the 302C test, an automated closed-system oxygen consumption measuring apparatus (BOD-meter) is used. The substance to be tested is inoculated in the testing vessels with micro-organisms. During the test period, the biochemical oxygen demand is measured continuously by means of a BOD-meter. Biodegradability is calculated on the basis of BOD and supplemental chemical analysis, such as measurement of the dissolved organic carbon concentration, concentration of residual chemicals, etc.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of the continuous phase of the fluid without the weight of any viscosity-increasing agent, dissolved salt, suspended particulate, or other materials or additives that may be present in the water.

If there is any difference between U.S. or Imperial units, U.S. units are intended. For example, "gal/Mgal" means U.S. gallons per thousand U.S. gallons.

Unless otherwise specified, mesh sizes are in U.S. Standard Mesh.

General Description

Water-based drilling fluids provide various environmental advantages over their invert (w/o) emulsion counterparts. However, shale instability is a big challenge while drilling with water-based muds (WBM). The shale instability leads to sloughing of shales, borehole collapse, stuck-pipe, and disintegration of shale leading to increase in fines. The increase in fines (solid particulate) can pose difficulties in rheology control. In addition, it can increase the low gravity solids concentration in a downhole drilling fluid leading to reduced ROP (rate of penetration) All these issues tend to increase the drilling time thereby the cost. As used herein, a "shale stabilizer" is a chemical substance that can be added to a drilling fluid to reduce shale sloughing.

Historically, either sodium chloride or potassium chloride salt has been the first choice to prevent shale instability. However these salts can adversely affect the eco-system by posing threat to the water as well as the soil quality. In the absence of salts, shale stabilizers thus play important role in combating with the problematic reactive shale formations.

Conventional shale stabilizers are provided as liquids. However, in addition to potential environmental concerns regarding any chemicals used in well operations such as drilling, problems such as solidifying in cold conditions, transport, and spillage are normally associated with liquids.

This invention relates to shale stabilizers that help prevent shale erosion with the use of a water based drilling fluid. The shale stabilizer of the invention is a cyclic oligosaccharide. More particularly, the cyclic oligosaccharide is a cyclodextrin or a derivative of cyclodextrin. It has been discovered that cyclodextrins can be used in a drilling fluid as an effective shale stabilizer.

Cyclodextrins are thermally very stable. For example, β-cyclodextrin begins to degrade at a very high temperature of 572° F. Thus, cyclodextrins can be used in well fluids under high temperature conditions.

Cyclodextrins are environmentally friendly, unlike most of the other conventionally used shale stabilizers. For example, cyclodextrins and derivatives are being used in pharmaceutical and food industry and are considered non-toxic. They show low eco-toxicity and are readily biodegradable.

In addition, a cyclodextrin, being a solid under Standard Laboratory Conditions, is free from the above mentioned problems associated with the handling of liquids. Cyclodextrins can be used either in the form of a solid or aqueous solution for making up a drilling fluid, as desired or depending upon the need.

Drilling Fluids

The well fluids include: (i) a continuous water phase; (ii) a viscosity-increasing agent, wherein the viscosity-increasing agent comprises water-soluble hydrophilic polymer; (iii) a fluid loss control agent; and (iv) a cyclodextrin-based compound.

Continuous Water Phase

The drilling fluid is a water-based fluid. In some embodiments, the water phase, including any dissolved materials therein, is present in the drilling fluids in an amount in the range from about 50% to 100% by volume of the drilling fluid.

Preferably, the water for use in the drilling fluid does not contain anything that would adversely interact with the other components used in the well fluid or with the subterranean formation.

The water phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water. As used herein, "brine" refers to water having at least 40,000 mg/L total dissolved solids.

Brines and other water sources may include those that comprise monovalent, divalent, or trivalent cations. Some divalent or trivalent cations, such as magnesium, calcium, iron, and zirconium, may, in some concentrations and at some pH levels, cause undesirable crosslinking of a polymeric viscosity-increasing agent. Such crosslinking may be problematic because, inter alia, it may cause filtration problems, injection problems, or causes regain permeability problems.

If a water source is used which contains such divalent or trivalent cations in concentrations sufficiently high to be problematic, then such divalent or trivalent salts may be removed, either by a process such as reverse osmosis, or by raising the pH of the water in order to precipitate out such salts to lower the concentration of such salts in the water before the water is used. Another method would be to include a chelating agent to chemically bind the problematic ions to prevent their undesirable interactions with the diutan. As used herein, the term "chelating agent" or "chelant" also refers to sequestering agents and the like. Suitable chelants include, but are not limited to, citric acid or sodium citrate. Other chelating agents also are suitable.

Weighting Agents

In an embodiment, the water-based drilling fluid includes a weighting agent. Examples of weighting agents are water-soluble salts, especially inorganic salts. The weighting agent can be dissolved in the water phase.

Salts may optionally be included in the drilling fluids for many purposes. For example, salts may be added to a water source, for example, to provide a brine, and a resulting drilling fluid, having a desired density. Salts may optionally be included for reasons related to compatibility of the drilling fluid with the formation and formation fluids.

The method according to claim 1, wherein the weighting agent is in at least a sufficient concentration such that the continuous water phase has a density of at least 8.5 ppg. More preferably, the weighting agent is in at least a sufficient concentration such that the continuous water phase has a density of at least 9 ppg. Most preferably, the weighting agent is in at least a sufficient concentration such that the continuous water phase has a density in the range of about 10 ppg to 18 ppg.

The disposal of returned drilling fluid can be a problem, however, including because of the inclusion of high concentrations of alkali metal halides such as KCl or NaCl, which are commonly used in drilling fluids. In an embodiment, the weighting agent comprises a water-soluble salt selected from the group consisting of: barium sulfate, hematite, calcium carbonate, and any combination thereof. Preferably, the weighting agent is barium sulfate. In an embodiment, however, the water-based drilling fluid includes less than 10% of any combination of dissolved alkali metal halide salts by weight of the water.

To determine whether a salt may be beneficially used for compatibility purposes, a compatibility test may be performed to identify potential compatibility problems. From such tests, one of ordinary skill in the art with the benefit of this disclosure will be able to determine whether a salt should be included in a drilling fluid.

Viscosity-Increasing Agents

A well fluid can be adapted to be a carrier fluid for particulates. For example, during drilling, rock cuttings should be carried uphole by the drilling fluid and flowed out of the wellbore. Rock cuttings can range in size from silt-sized particles to chunks measured in centimeters. The rock cuttings typically have specific gravity greater than 2, which is much higher than that of many drilling fluids. These high-density cuttings have a tendency to separate from water or oil very rapidly.

As many well fluids are water-based, partly for the purpose of helping to suspend particulate of higher density, and for other reasons known in the art, the density of the fluid used in a well can be increased by including highly water-soluble salts in the water. However, increasing the density of a well fluid will rarely be sufficient to match the density of the particulate.

Increasing the viscosity of a well fluid can help prevent a particulate having a different specific gravity than a surrounding phase of the fluid from quickly separating out of the fluid.

A viscosity-increasing agent can be used to increase the ability of a fluid to suspend and carry a particulate material in a well fluid. A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers (e.g., polyacrylamide).

As used herein, a "polysaccharide" can broadly include a modified or derivative polysaccharide.

A polymer can be classified as being single chain or multi chain, based on its solution structure in aqueous liquid media. Examples of single-chain polysaccharides that are commonly used in the oilfield industry include guar, guar derivatives, and cellulose derivatives. Examples of multi-chain polysaccharides include xanthan, diutan, and scleroglucan, and derivatives of any of these.

Synthetic polymers and copolymers may be used. Examples of such synthetic polymers include, but are not limited to, polyacrylate, polymethacrylate, polyacrylamide, polyvinyl alcohol, and polyvinylpyrrolidone.

The viscosity-increasing agent can be provided in any form that is suitable for the particular well fluid or application. For example, the viscosity-increasing agent can be provided as a liquid, gel, suspension, or solid additive that is admixed or incorporated into a well fluid.

The viscosity-increasing agent should be present in a well fluid in a form and in an amount at least sufficient to impart the desired viscosity to a well fluid. If used, a viscosity-increasing agent may be present in the well fluids in a concentration in the range of from about 0.01% to about 5% by weight of the water of the continuous water phase.

The viscosity of a fluid at a given concentration of viscosity-increasing agent can be greatly increased by cross-linking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

Cross-linking agents typically comprise at least one metal ion that is capable of cross-linking the viscosity-increasing agent molecules.

Some crosslinking agents form substantially permanent crosslinks with viscosity-increasing polymer molecules. Such crosslinking agents include, for example, crosslinking agents of at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate) titanium compounds (such as, for example, titanium lactate, titanium maleate, titanium citrate, titanium ammonium lactate, titanium triethanolamine, and titanium acetylacetonate) aluminum compounds (such as, for example, aluminum acetate, aluminum lactate, or aluminum citrate) antimony compounds; chromium compounds; iron compounds (such as, for example, iron chloride) copper compounds; zinc compounds; sodium aluminate; or a combination thereof.

Sometimes, however, crosslinking is undesirable, as it may cause the polymeric material to be more difficult to break and it may leave an undesirable residue in the formation.

Most, if not all, of the commonly used water-soluble viscosity-increasing agents are hydratable. As referred to herein, "hydratable" means capable of being hydrated by contacting the hydratable agent with water. Regarding a hydratable agent that includes a polymer, this means, among other things, to associate sites on the polymer with water molecules and to unravel and extend the polymer chain in the water. Viscosity-increasing agents have been conventionally hydrated directly in the water at the concentration to be used for the well fluid.

A common problem with using hydratable agents is that many of the commonly-used hydratable agents used for such purposes are sensitive to dissolved ions in the water. The hydratable agents are often especially sensitive to divalent cations such as calcium and magnesium. For example, divalent cations such as calcium and magnesium may inhibit and slow the time required for hydration of certain types of polymers commonly used for such purposes.

In the context of hydratable polymers, water having total dissolved solids of more than 0.67 lb/gal (80 g/l) such that the density of the water with the total dissolved solids is more than 9.0 lb/gal, is generally considered too high for many types of hydratable polymers. Some hydratable polymers may be sensitive to lower concentrations of total dissolved solids ("TDS").

For example, xanthan gum, which is sometimes used as a viscosity-increasing agent, can be slow and difficult to hydrate thoroughly in such aqueous solutions. Full hydration of the xanthan polymer is important because incomplete hydration will impair development of viscosity in the fluid and may cause fine particulate matter of incompletely hydrated xanthan gum to damage the permeability of the formation. Hydration of xanthan in freshwater is not usually problematic.

Furthermore, the hydratable polymer may be sensitive to other ions, including borate ions, which in some cases and under certain conditions can undesirably crosslink the polymer.

It should be understood that merely increasing the viscosity of a fluid may only slow the settling or separation of distinct phases and does not necessarily stabilize the suspension of any particles in the fluid.

Certain viscosity-increasing agents can also help suspend a particulate material by increasing the elastic modulus of the fluid. The elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascal) or dyne/cm$^2$. As a point of reference, the elastic modulus of water is negligible and considered to be zero.

An example of a viscosity-increasing agent that is also capable of increasing the suspending capacity of a fluid is to use a viscoelastic surfactant. As used herein, the term "viscoelastic surfactant" refers to a surfactant that imparts or is capable of imparting viscoelastic behavior to a fluid due, at least in part, to the three-dimensional association of surfactant molecules to form viscosifying micelles. When the concentration of the viscoelastic surfactant in a viscoelastic fluid significantly exceeds a critical concentration, and in most cases in the presence of an electrolyte, surfactant molecules aggregate into species such as micelles, which can interact to form a network exhibiting elastic behavior.

As used herein, the term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure.

These micelles may function, among other purposes, to stabilize emulsions, break emulsions, stabilize a foam, change the wettability of a surface, solubilize certain materials, or reduce surface tension. When used as a viscosity-increasing agent, the molecules (or ions) of the surfactants used associate to form micelles of a certain micellar structure (e.g., rod-like, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid or forming a gel. Certain viscosifying micelles may impart increased viscosity to a fluid such that the fluid exhibits viscoelastic behavior (e.g., shear thinning properties) due, at least in part, to the association of the surfactant molecules contained therein.

As used herein, the term "surfactant gel" refers to fluids that exhibit or is capable of exhibiting viscoelastic behavior due, at least in part, to the association of surfactant molecules contained therein to form viscosifying micelles.

Viscoelastic surfactants may be cationic, anionic, or amphoteric in nature. The viscoelastic surfactants can include any number of different compounds, including methyl ester sulfonates, hydrolyzed keratin, sulfosuccinates, taurates, amine oxides, ethoxylated amides, alkoxylated fatty acids, alkoxylated alcohols (e.g., lauryl alcohol ethoxylate, ethoxylated nonyl phenol) ethoxylated fatty amines, ethoxylated alkyl amines (e.g., cocoalkylamine ethoxylate) betaines, modified betaines, alkylamidobetaines (e.g., cocoamidopropyl betaine) quaternary ammonium compounds (e.g., trimethyltallowammonium chloride, trimethylcocoammonium chloride) derivatives thereof, and combinations thereof.

In some treatment fluids, hydrophobically modified water-soluble polymer has sometimes been used. This is less common in drilling fluids, however. As used herein, a "hydrophobically modified water-soluble polymer" is based on a polymer that without the hydrophobic modification is or would be water soluble. As used herein, "hydrophobically modified" refers to the incorporation into the water-soluble (hydrophilic) polymer structure of hydrophobic groups, wherein the alkyl chain length is from about 4 to about 22 carbons. Preferably, the hydrophobically modified water-soluble polymer is water soluble.

The hydrophobically modified water-soluble polymers typically have a molecular weight in the range of from about 100,000 to about 10,000,000. In exemplary embodiments, the hydrophobically modified water-soluble polymers have a polymer backbone having polar heteroatoms. Generally, the polar heteroatoms present within a polymer backbone of the hydrophobically modified water-soluble polymer include, but are not limited to, oxygen, nitrogen, sulfur, or phosphorous.

A hydrophobically-modified water-soluble polymer can have, for example, a plurality of hydrophobic groups attached to or within the backbone, wherein one or more of the hydrophobic groups includes a secondary amine, or a tertiary amine, a tertiary phosphine, a quaternary amine, or any combination thereof.

Additional information regarding hydrophobically modified polymers is disclosed, for example, in U.S. Pat. No. 7,563,750 issued Jul. 21, 2009, having for named inventors Larry S. Eoff, Eldon Dwyann Dalrymple, and B. Raghava Reddy, which is incorporated herein by reference in its entirety.

In an embodiment of the invention, the viscosity-increasing agent comprises or is a water-soluble hydrophilic polymer. A hydrophilic polymer is water soluble. For example, the viscosity-increasing agent can include a polymeric material selected from the group consisting of a cellulosic, polyacrylic, or natural gum polymer.

In an embodiment of the present invention, however, the viscosity-increasing agent is not a viscoelastic surfactant. For example, in an embodiment the water-based drilling fluid has less than a sufficient concentration of a viscoelastic surfactant to increase the viscosity of the water-based drilling fluid by more than 10 cP. In another embodiment, the water-based drilling fluid has less than 0.01% by weight of the water of any viscoelastic surfactant. In another embodiment, the water-based drilling fluid does not include a viscoelastic surfactant.

In an embodiment of the present invention, however, the viscosity-increasing agent is not hydrophobically modified. For example, in an embodiment the water-based drilling fluid has less than a sufficient concentration of a hydrophobically-modified hydrophilic polymer to increase the viscosity of the water-based drilling fluid by more than 10 cP. In another embodiment, the water-based drilling fluid has less than 0.01% by weight of the water of any hydrophobically-modified hydrophilic polymer. In another embodiment, the water-based drilling fluid does not include a hydrophobically-modified hydrophilic polymer.

Fluid-Loss Control Agents

"Fluid loss" refers to the undesirable leakage of a fluid phase of any type of well fluid into the permeable matrix of a zone. "Fluid-loss control" refers to additives or methods designed to reduce such undesirable leakage. Providing effective fluid-loss control for well fluids during certain stages of well operations is usually highly desirable.

The usual approach to fluid-loss control is to substantially reduce the permeability of the matrix of the zone with a fluid-loss control material that blocks the permeability at or near the face of the rock matrix of the zone. For example, the fluid-loss control material may be a particulate that has a size selected to bridge and plug the pore throats of the matrix. All else being equal, the higher the concentration of the appropriately sized particulate, the faster bridging will occur. As the fluid phase carrying the fluid-loss control material leaks into the formation, the fluid-loss control material bridges the pore throats of the matrix of the formation and builds up on the surface of the borehole or fracture face or penetrates only a little into the matrix. The buildup of solid particulate or other fluid-loss control material on the walls of a wellbore or a fracture is referred to as a filter cake. Depending on the nature of a fluid phase and the filter cake, such a filter cake may help block the further loss of a fluid phase (referred to as a filtrate) into the subterranean formation. A fluid-loss control material is specifically designed to lower the volume of a filtrate that passes through a filter medium.

Fluid-loss control materials are sometimes used in drilling fluids. Through a combination of viscosity, solids bridging, and cake buildup on the porous rock, these pills oftentimes are able to substantially reduce the permeability of a zone of the subterranean formation to fluid loss. They also generally enhance filter-cake buildup on the face of the formation to inhibit fluid flow into the formation from the wellbore.

Fluid-loss control pills typically include an aqueous continuous phase and a high concentration of a viscosifying agent (usually crosslinked).

Fluid-loss control agents can include, for example, a filter cake forming material, sometimes also known as a filtration control agent (such as clay (e.g., bentonite) or an organic colloidal-sized solid particulate (e.g., a biopolymer, cellulose polymer, or starch, modified starch, polyanionic cellulose, plant tannin, a polyphosphate, a lignitic material, a lignosulfonate, or a synthetic polymer), a filter cake bridging material (such as a calcium carbonate particulate, a cellulose particulate, an asphalt particulate, and a gilsonite particulate), and a lost circulation material to block larger openings in the formation (such as an appropriately-sized particulate of walnut shells, mica, xanthan, and modified cellulose). These and other materials are known in the art as fluid-loss control agents.

In an embodiment, the fluid-loss control agent is in a concentration of at least 1 ppg of the continuous water phase.

Crosslinked gels can also be used for fluid-loss control. Crosslinking the gelling agent polymer helps create a gel structure that can suspend solids as well as provide fluid-loss control. Further, crosslinked fluid-loss control pills have demonstrated that they require relatively limited invasion of the formation face to be fully effective. To crosslink the viscosifying polymers, a suitable crosslinking agent that includes polyvalent metal ions is used. Boron, aluminum, titanium, and zirconium are common examples.

In an embodiment, the viscosity-increasing agent can help form a filtercake. In addition, a drilling fluid according to the invention preferably includes a filtrate control agent.

After application of a filter cake, it may be desirable to restore permeability into the formation. If the formation permeability of the desired producing zone is not restored, production levels from the formation can be significantly lower. Any filter cake or any solid or polymer filtration into the matrix of the zone resulting from a fluid-loss control application must be removed to restore the formation's permeability, preferably to at least its original level. This is often referred to as clean up.

The term "damage" as used herein refers to undesirable deposits in a subterranean formation that may reduce its permeability. Scale, skin, gel residue, and hydrates are contemplated by this term. Also contemplated by this term are geological deposits, such as, but not limited to, carbonates or clay particulates located on the pore throats of the sandstone in a subterranean formation.

After a well fluid is placed or used where desired in the well and for the desired time, the fluid usually must be removed from the wellbore or the formation to regain permeability for producing oil or gas from a formation.

Chemical breakers can be used to help remove a filtercake. No particular mechanism is necessarily implied by the term. Breakers must be selected to meet the needs of each situation. First, it is important to understand the general performance criteria of breakers. In reducing the viscosity of the well fluid to a near water-thin state, the breaker must maintain a critical balance. Premature reduction of viscosity during the pumping or use of a well fluid can jeopardize the operation. Inadequate reduction of fluid viscosity after pumping can also reduce production if the required conductivity is not obtained.

For a polymeric viscosity-increasing agent, the breakers operate by cleaving the backbone of polymer by hydrolysis of acetyl group, cleavage of glycosidic bonds, oxidative/reductive cleavage, free radical breakage, or a combination of these processes.

Chemical breakers used to help remove a filtercake formed with such a viscosity-increasing agent are generally grouped into three classes: oxidizers, enzymes, and acids.

Cyclodextrin-Based Compound

As used herein, a "cyclodextrin-based compound" means a cyclodextrin or a derivative of cyclodextrin.

Cyclodextrins are a family of compounds made up of sugar molecules chemically bonded together in a ring. More particularly, cyclodextrins are cyclic oligosaccharide comprising at least 6 glucopyranose units joined by α-(1,4) glycosidic linkages. Common cyclodextrins comprise 6 to 8 glucopyranose units, where α-cyclodextrin has six glucopyranose units, β-cyclodextrin has seven glucopyranose units, and γ-cyclodextrin has eight glucopyranose units. Cyclodextrins are produced from starch by means of enzymatic conversion. They are used in food, pharmaceutical, and chemical industries, as well as agriculture and environmental engineering.

The term "derivative" in regard to a cyclodextrin means comprising any cyclodextrin as just defined in which at least one of the constituent glucose units is substituted, at least at one point, by a group or a molecule which can be of very diverse size and functionality, such as, for example, an alkyl or hydroxyalkyl group, and especially a hydroxypropyl group, or a mono- or disaccharide molecule such as a maltose, glucose, fructose or sucrose molecule. Examples of substituent groups include methyl, acetyl, hydroxypropyl, or hydroxyethyl groups. Examples of cyclodextrin derivatives are methyl-α-cyclodextrin and hydroxypropyl-α-cyclodextrin, in particular methyl-α-cyclodextrin. The term "derivative" also encompasses cyclodextrin polymers obtained, for example, by reaction of cyclodextrins with polyfunctional reactants. Examples of cyclodextrin derivatives are methyl-α-cyclodextrin and hydroxypropyl-α-cyclodextrin, in particular methyl-α-cyclodextrin.

Figure 1:
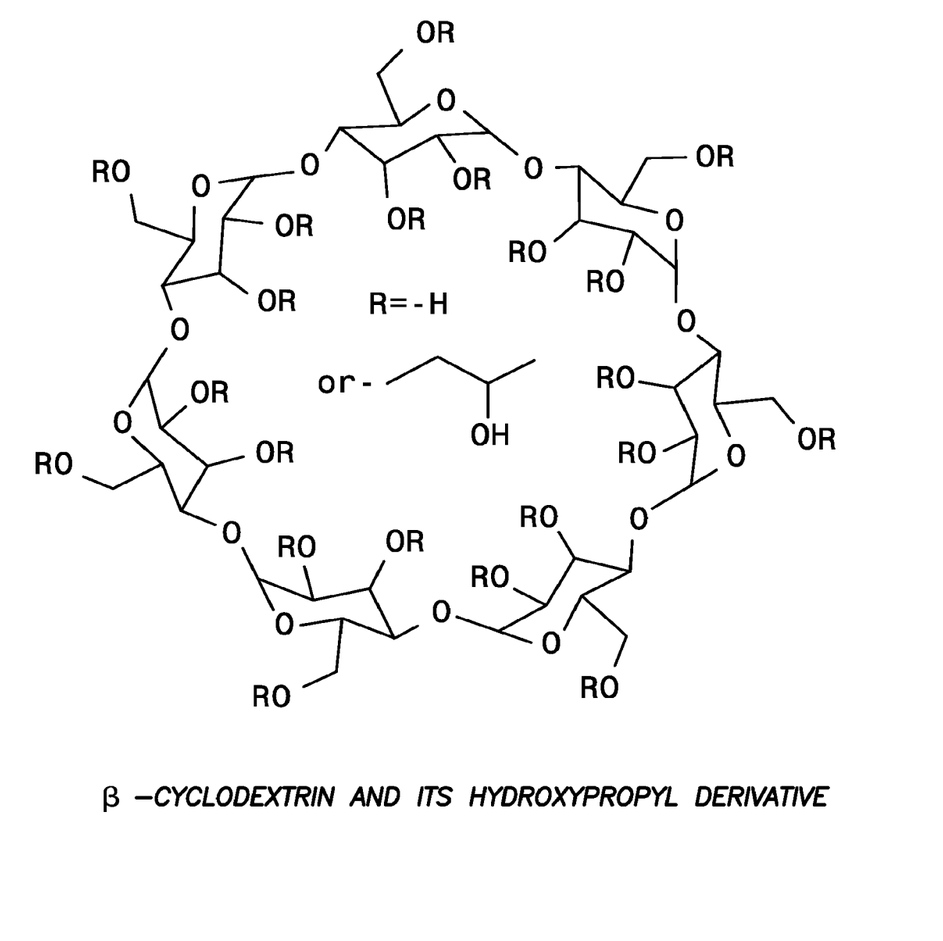
FIG. 1 illustrates the chemical structure of β cyclodextrin and its hydroxypropyl derivative.

In an embodiment of the invention, the shale stabilizer is a cyclodextrin-based compound. In an embodiment the cyclodextrin has in the range of 6 to 8 glucopyranose units. In an embodiment, the shale stabilizer is β-cyclodextrin or a derivative of β-cyclodextrin. In an embodiment, the shale stabilizer of the present invention is β-cyclodextrin or hydroxypropyl-β-cyclodextrin. FIG. 1 illustrates the chemical structure of β cyclodextrin and its hydroxypropyl derivative.

As cyclodextrins result from renewable plant matter, namely amylaceous matter, their biodegradability and their non-toxicity make them products which are entirely tolerated by the environment.

As cyclodextrin-based compounds are known to interact with hydrophobic groups through hydrophobic interactions, in an embodiment the drilling fluid excludes other chemicals with such hydrophobic groups. U.S. Pat. No. 8,114,818. Without being limited by any theory, the cyclodextrin modifier includes an internal cavity (see FIG. 1) that is believed to be capable of hosting a hydrophobic portion of a "guest" compound, such as of viscoelastic surfactant or a hydrophobically modified polymer. It is believed that such interaction or entrapment of the hydrophobic portion of a viscosifying agent would deactivate properties associated with hydrophobic associations that increase the viscosity of the fluid. Accordingly, the cyclodextrin-based compound may undesirably decrease the viscosity of a drilling fluid for which a viscoelastic surfactant or hydrophobically-modified polymer contributes to the desired viscosity.

Similarly, because viscoelastic surfactants or hydrophobically-modified water-soluble polymers might interact with and degrade the effectiveness of the cyclodextrin compound as a shale stabilizer, it is contemplated in certain embodiments such surfactants or hydrophobically-modified water-soluble polymers not be employed in the drilling fluid.

In an embodiment, the cyclodextrin-based compound does not substantially interact with the viscosity-increasing agent. For example, in an embodiment, the cyclodextrin-based compound does not increase the viscosity of the water-based drilling fluid by more than 10 cP (relative to an otherwise similar fluid without the cyclodextrin-based compound). In an embodiment, the cyclodextrin-based compound at least does not reduce the viscosity of the continuous water phase by more than 10 cP (relative to an otherwise similar fluid without the cyclodextrin-based compound).

pH and pH Adjuster

Preferably, the pH of the continuous aqueous phase of the drilling fluid is at least 7. More preferably, the pH of the drilling fluid is at least 8. In an embodiment, the pH of the drilling fluid is at least 9.

In certain embodiments, the drilling fluids can include a pH-adjuster. Preferably, the pH adjuster does not have undesirable properties, as discussed above.

The pH-adjuster may be present in the drilling fluids in an amount sufficient to maintain or adjust the pH of the fluid. In some embodiments, the pH-adjuster may be present in an amount sufficient to maintain or adjust the pH of the fluid to a desired pH.

In general, a pH-adjuster may function, inter alia, to affect the hydrolysis rate of the viscosity-increasing agent. In some embodiments, a pH-adjuster may be included in the drilling fluid, inter alia, to adjust the pH of the drilling fluid to, or maintain the pH of the drilling fluid near, a pH that balances the duration of certain properties of the drilling fluid (e.g. the ability to suspend particulate).

In some embodiments, the pH-adjuster may comprise a small amount of a base such as MgO, NaOH, $Na_2CO_3$, $Mg(OH)_2$, and any combination thereof. The pH adjuster can be a buffer. In other embodiments, the pH-adjuster may be any other substance known in the art capable of maintaining the pH of the breaker in a limited range. One of ordinary skill in the art, with the benefit of this disclosure, will recognize the appropriate pH-adjuster and amount thereof to use for a chosen application.

Other Additives

The method according to claim 1, wherein the water-based drilling fluid additionally comprises one or more additives selected from the group consisting of: a surfactant (such foamer, defoamer, wetting agent, detergent, lubricant, and corrosion inhibitor), a water softener (such as sodium carbonate), an oxygen scavenger, a biocide, and a corrosion inhibitor (other than surfactant).

Drilling Fluid as O/W Emulsion

If desired, the drilling fluids may be used in the form of an oil-in-water emulsion. An example of a suitable emulsion would comprise an aqueous continuous phase and a suitable hydrocarbon as another phase. In some embodiments, the emulsion may comprise approximately 70% of an aqueous continuous phase and 30% of a suitable hydrocarbon. Other benefits and advantages to using emulsions for certain well fluids and methods will be evident to one of ordinary skill in the art.

Method of Drilling a Zone with the Drilling Fluid

According to an embodiment of the invention, a method of drilling a well is provided, the method including the steps of: forming a drilling fluid according to the invention; and drilling in the well. In an embodiment, the drilling zone penetrates or is in a subterranean formation of shale.

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going drilling. Such mixing can also be described as "real-time" mixing.

In an embodiment, the step of delivering a well fluid into a well is within a relatively short period after forming the well fluid, e.g., less within 30 minutes to one hour. More preferably, the step of delivering the well fluid is immediately after the step of forming the well fluid, which is "on the fly." It should be understood that the step of delivering a well fluid into a well can advantageously include the use of one or more fluid pumps.

In an embodiment, the step of introducing comprises introducing under conditions for drilling the zone. The step of introducing can be at the same time or as part of the step of drilling. In an embodiment, the step of introducing is at a rate and pressure below the fracture pressure of the zone.

In an embodiment, the step of drilling is in a zone that penetrates or is in a subterranean formation of shale.

Preferably, after drilling, a step of producing hydrocarbon from the subterranean formation is the desirable objective.

EXAMPLES

To facilitate a better understanding of the present invention, the following examples of certain aspects of some embodiments are given. In no way should the following examples be read to limit, or define, the entire scope of the invention.

To test for the effectiveness of a cyclodextrin as a shale stabilizer, shale recovery tests and fluid rheology tests were performed on 11 pound per US gallon ("ppg") water-based drilling fluids.

In general, a shale sample was initially kept overnight in an oven at 105° C. for drying. The dried shale was then crushed in a pestle-mortar and screened to obtain shale cuttings that pass through a 5 US mesh screen, but are retained on a 10 US mesh screen. The graded shale cuttings (30 grams) were placed into drilling fluid samples in pint-sized jars. The drilling fluids along with the cuttings in the pint jars were hot rolled at 150° F. and 20 revolutions per minute (rpm) for 16 hours. After completion of the rolling, the cuttings were again screened through a 10-mesh screen. The cuttings retained on the 10 mesh screen are then washed with 5% KCl solution, subsequently with water, then dried at 105° C., and finally weighed. The test results are provided as percent recovery of the shale.

The shale recovery testing was performed using a sample of London clay outcrop cuttings. The X-ray diffraction ("XRD") composition of the clay is provided in Table 1.

TABLE 1

Composition of the London Clay Sample
London clay

| | |
|---|---|
| Quartz, wt % | 26.00 |
| Smectite, wt % | 20.00 |
| Illite, wt % | 49.00 |
| Kaolin, wt % | 1.00 |
| Chlorite, wt % | 2.00 |

A typical water-based drilling fluid was formed as "base" fluid for the testing. The base fluid was an 11 ppg water-based drilling fluid was formulated with water, a viscosity-increasing agent (a water-soluble hydrophilic polymer, specifically, xanthan), a weighting agent (barite, also known as barium sulfate), a filtration control agent, and a pH adjuster. In some embodiments, the drilling fluid does not include inorganic halide salts (e.g., NaCl or KCl), which can cause problems in certain kinds of subterranean formations.

The viscosity-increasing agent used in the base fluid was BARAZAN D™ xanthan gum powder, which is commercially available from Baroid Industrial Drilling Products of Halliburton Energy Services, Inc.

The fluid-loss control agents used were a polyanionic cellulose and a modified starch, which types of products are commercially available from Baroid Industrial Drilling Products of Halliburton Energy Services, Inc.

In a preferred embodiment of a water-based drilling fluid, a polyanionic cellulose is used as a fluid-loss control agent, which can also provide secondary viscosity, is effective at low concentrations, is suitable for use in fresh water, salt water, and brine-based fluids, is stable up to 300° F. (149° C.), is non-toxic, and does not require the use of a biocide.

In a preferred embodiment of a water-based drilling fluid, a modified starch is used as an additional fluid-loss control agent to reduce mud filtrate in most water-based fluid systems. Such a modified starch can be made to be functional in freshwater through saturated salt environments and does not increase fluid viscosity, is temperature stable to approximately 250° F. (121° C.).

The weighting agent used in the base fluid was barite, which is also known as barium sulfate. Barite is commonly used to weight drilling muds. Typically, 85% to 90% of the barite additive (as a solid particulate before dissolving) will pass through a 325 US mesh sieve. Barite additive is effective at bottom hole temperatures (BHTs) up to about 500° F. (260° C.) A barite additive concentration of 135 lb/sack of cement will provide a maximum slurry weight of 19 lb/gal. Barite additive can increase slurry density to help restrain high formation pressures and improve mud displacement, has application in deep, high-temperature wells, and the US Environmental Protection Agency (EPA) does not classify barite additive as a hazardous waste.

The pH control agent used was BARABUF™, commercially available from Baroid Industrial Drilling Products of Halliburton Energy Services, Inc. BARABUF™ pH buffer is a fine powder of 98% magnesium oxide (MgO) It is used to provide alkalinity for all water based systems and is compatible with freshwater, brines, and brine polymer systems. BARABUF™ pH buffer will dissolve in water and raise the pH of an aqueous system to 10.3. At pH 10.3, no more BARABUF™ pH buffer will dissolve. The remaining undissolved product will dissolve if the pH starts to fall and thereby act as a pH buffer. BARABUF™ pH buffer can be safer to use than caustic soda.

The particular formulation of the base fluid is provided in Table 2. The % shale recovery obtained for this 11 ppg "base" base fluid was 33%.

Water-based drilling fluids that were similar to the base fluid were then formulated with a few conventionally employed shale stabilizers. The particular formulations are provided as drilling fluids 1, 2, and 3 in Table 2. The percent recovery of London Clay obtained for fluids with these conventionally employed shale stabilizers was 86.2%, 72.4% and 84.2% respectively.

In addition, water-based drilling fluids that were similar to the base fluid were then formulated with β-cyclodextrin (at two different concentrations) and hydroxypropyl β-cyclodextrin. The particular formulations are provided as drilling fluids 4, 5, and 6 in Table 2. The percent recovery of London Clay for the three fluids formulated with β-cyclodextrin and hydroxypropyl β-cyclodextrin was 84%, 88.4%, and 88%.

These results show that the cyclodextrin and its derivative helped in achieving the shale stability in a very reactive London Clay and its performance as a shale stabilizer was comparable to that of the conventional shale stabilizers.

TABLE 2

Shale Recovery for Drilling Fluids Hot Rolled with London Clay Sample

| Drilling Fluid | Base | 1 | 2 | 3 | 4 | 5 | 6 |
|---|---|---|---|---|---|---|---|
| Water (lb) | 313 | 306.55 | 310 | 297.5 | 310 | 307 | 310 |
| NaCl (lb) | 0 | 0 | 0 | 0 | 0 | 0 | 0 |
| Xanthan gum (lb) | 0.65 | 0.65 | 0.65 | 0.65 | 0.65 | 0.65 | 0.65 |

TABLE 2-continued

Shale Recovery for Drilling Fluids Hot Rolled with London Clay Sample

| Drilling Fluid | Base | 1 | 2 | 3 | 4 | 5 | 6 |
|---|---|---|---|---|---|---|---|
| Polyanionic cellulose fluid-loss control agent (lb) | 1 | 1 | 1 | 1 | 1 | 1 | 1 |
| Modified starch fluid-loss control agent (lb) | 2 | 2 | 2 | 2 | 2 | 2 | 2 |
| Conventional shale inhibitor #1 (lb) | — | 7 | — | — | — | — | — |
| Conventional shale inhibitor #2 (lb) | — | — | 3.5 | — | — | — | — |
| Conventional shale inhibitor #3 (lb) | — | — | — | 15 | — | — | — |
| β-Cyclodextrin (lb) | — | — | — | — | 3 | 6 | — |
| Hydroxypropyl-β-cyclodextrin (lb) | — | — | — | — | — | — | 3 |
| Barite (lb) | 145.3 | 146 | 145.3 | 145.3 | 145.3 | 145.3 | 145.3 |
| BARABUF ™ pH buffer (lb) | 0.2 | 0.25 | 0.15 | 0.25 | 0.15 | 0.15 | 0.15 |
| pH before hot rolling w Shale | 9 | 9.47 | 9.2 | 9.2 | 9.2 | 9.2 | 9.2 |
| pH after hot rolling w Shale | 9.83 | 9.3 | 9 | 9.4 | 9.6 | 9.4 | 9.6 |
| % Shale Recovery | 33 | 86.2 | 72.4 | 84.2 | 84 | 88.4 | 88 |

In addition, the Plastic Viscosity (PV) Yield Point (YP) Yield Stress (Tau zero) and Low Shear Yield Point (LSYP) of the invert (w/o) emulsion drilling fluids were determined according to techniques well known in the art using a direct-indicating FANN 35™ rheometer powered by an electric motor. These results for the above formulations are also provided in Table 3.

More particularly, the rheometer consists of two concentric cylinders, the inner cylinder called as the bob while the outer cylinder is called as the rotor sleeve. The drilling fluid sample was placed in a thermostatically controlled cup and the temperature of the fluid was adjusted to 120±2° F. The drilling fluid in the thermostatically controlled cup was then placed in the annular space between two concentric cylinders of the rheometer. The outer cylinder or rotor sleeve was driven at a constant rotational velocity. The rotation of the rotor sleeve in the fluid produces a torque on the inner cylinder or bob. A torsion spring restrains the movement of the bob, and a dial attached to the bob indicates displacement of the bob. The dial readings were measured at different rotor sleeve speeds of 3, 6, 100, 200, 300 and 600 rpm. The dial readings are shown in Table 3.

Plastic Viscosity (PV) is obtained from the Bingham-Plastic rheological model and represents the viscosity of a fluid when extrapolated to infinite shear rate. The PV is obtained from the 600 rpm and the 300 rpm dial readings as given below in Equation 1.

$$PV = (600 \text{ rpm dial reading}) - (300 \text{ rpm dial reading}) \quad \text{(Equation 1)}$$

Yield point (YP) is defined as the value obtained from the Bingham-Plastic rheological model when extrapolated to a shear rate of zero. It may be calculated using 300 revolutions per minute (rpm) and 600 rpm dial readings on a standard oilfield rheometer.

Similarly, yield stress (Tau zero) is the stress that must be applied to a material to make it begin to flow (or yield) and may commonly be calculated from rheometer dial readings measured at rates of 3, 6, 100, 200, 300 and 600 rpm. The extrapolation in this case may be performed by applying a least-squares fit or curve fit to the Herchel-Bulkley rheological model.

A more convenient means of estimating the yield stress is by calculating the Low-Shear Yield Point (LSYP) by the same formula shown below in Equation 2 though with the 6 rpm and 3 rpm dial readings substituted for the 600 rpm and 300 rpm dial readings, respectively.

$$YP = (300 \text{ rpm dial reading}) - PV \quad \text{(Equation 2)}$$

A low PV may indicate that a fluid is capable of being used in rapid drilling because, among other things, the fluid has low viscosity upon exiting the drill bit and has an increased flow rate. A high PV may be caused by a viscous base fluid, excess colloidal solids, or both.

Gel strengths were measured at 10 seconds as follows. The drilling fluid sample is stirred for 10 seconds at 600 revolutions per minute (rpm) on a FANN 35™ rheometer. The drilling fluid sample is allowed to stand undisturbed for 10 seconds. The hand wheel was slowly and steadily turned in the appropriate direction to produce a positive dial reading. For instruments having a 3 rpm speed, the maximum reading attained after starting rotation at 3 rpm is the 10-s gel strength. The 10-s gel strength in pounds per 100 square feet (lb/100 sq ft) was recorded. The 10-second gel strength is considered the initial gel strength of the fluid.

Gel strengths were also measured at 10 minutes as follows. The drilling fluid sample is again re-stirred at 600 rpm for 10 seconds and then the fluid was allowed to stand undisturbed for 10 minutes. The hand wheel was slowly and steadily turned in the appropriate direction to produce a positive dial reading. The maximum reading attained after starting rotation at 3 rpm is the 10-min gel strength. The 10-s gel strength in pounds per 100 square feet (lb/100 sq ft) was recorded.

More particularly, each of these tests were conducted in accordance with standard procedures set forth in Recommended Practice 13B-2, Recommended Practice for Field Testing of Oil-based Drilling Fluids, Fourth Edition, American Petroleum Institute, Mar. 1, 2005, the contents of which is hereby incorporated herein by reference.

TABLE 3

Drilling Fluid Rheological Properties

| Drilling Fluid | Base | 1 | 2 | 3 | 4 | 5 | 6 |
|---|---|---|---|---|---|---|---|
| 600 rpm dial reading | 51 | 49 | 81 | 62 | 63 | 59 | 65 |
| 300 rpm dial reading | 38 | 36 | 56 | 45 | 47 | 43 | 50 |
| 200 rpm dial reading | 29 | 30 | 47 | 39 | 42 | 35 | 42 |
| 100 rpm dial reading | 15 | 21 | 35 | 28 | 31 | 26 | 30 |

TABLE 3-continued

Drilling Fluid Rheological Properties

| Drilling Fluid | Base | 1 | 2 | 3 | 4 | 5 | 6 |
|---|---|---|---|---|---|---|---|
| 6 rpm dial reading | 4 | 5 | 10 | 6 | 7 | 7 | 7 |
| 3 rpm dial reading | 3 | 4 | 8 | 4 | 5 | 4 | 6 |
| Plastic Viscosity | 13 | 13 | 25 | 17 | 16 | 16 | 15 |
| Yield Point | 25 | 23 | 31 | 28 | 31 | 27 | 35 |
| 10 sec Gel Strength (lb/100 sq ft) | 3 | 4 | 9 | 5 | 6 | 5 | 6 |
| 10 min Gel Strength (lb/100 sq ft) | 3 | 3 | 10 | 4 | 5 | 4 | 5 |

A thermogravimetric analysis ("TGA") was performed to obtain thermal stability of β-cyclodextrin. TGA of β-cyclodextrin shows that it exhibits thermal stability up to 572° F. (300° C.) after which it begins to degrade. Such a high thermal stability of β-cyclodextrin shows that it can be used in high-temperature, high-pressure ("HTHP") conditions in water based fluids.

Cyclodextrins are commonly used as additives in food and pharmaceutical industries. Cyclodextrins have a National Fire Protection Rating ("NFPA") health, flammability, and instability/reactivity ratings of 1, 1, 0, respectively. Beta-cyclodextrin is readily biodegradable with 82% biodegradability in 28 days according to Zahn/Wellens EMPA test for inherent biodegradability, which was adopted as the OECD 302B test. The acute oral/dermal LD 50 toxicity values were greater than 2000 mg/kg for rat when subjected to sample exposure. Beta cyclodextrin when subjected to eco toxicity studies exhibited a 96-hr $LC_{50}$ of 7561 mg/l to Cyprinus carpio (common carp). For the tests involving Daphnia magna, beta cyclodextrin exhibited a 48-hr $EC_{50}$ of >100 mg/L. Beta cyclodextrin exhibited a 72-hr density $EC_{50}$ of greater than 100 mg/L to desmodesmus subspicatus (a common freshwater green algae) Source: http://www.cyclodextrin.org/CDPDF/safety/cavamaxw7food.pdf.

CONCLUSION

Therefore, the present invention is well adapted to attain the ends and advantages mentioned as well as those that are inherent therein.

The exemplary well fluids disclosed herein may directly or indirectly affect one or more components or pieces of equipment associated with the preparation, delivery, recapture, recycling, reuse, or disposal of the disclosed well fluids. For example, the disclosed well fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary well fluids. The disclosed well fluids may also directly or indirectly affect any transport or delivery equipment used to convey the well fluids to a well site or downhole such as, for example, any transport vessels, conduits, pipelines, trucks, tubulars, or pipes used to fluidically move the well fluids from one location to another, any pumps, compressors, or motors (e.g., topside or downhole) used to drive the well fluids into motion, any valves or related joints used to regulate the pressure or flow rate of the well fluids, and any sensors (i.e., pressure and temperature) gauges, or combinations thereof, and the like. The disclosed well fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits) sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of composition, design, or steps herein shown, other than as described in the claims.

What is claimed is:

1. A well fluid comprising:
   (i) a continuous water phase;
   (ii) a viscosity-increasing agent, wherein the viscosity-increasing agent comprises water-soluble hydrophilic polymer;
   (iii) a fluid loss control agent; and
   (iv) a cyclodextrin-based compound,
   wherein the well fluid does not include a hydrophobically-modified hydrophilic polymer.

2. The well fluid according to claim 1, wherein the cyclodextrin-based compound does not interact with the viscosity-increasing agent to increase or decrease the viscosity of the well fluid by more than 10 cP.

3. The well fluid according to claim 1, wherein the well fluid has less than a sufficient concentration of the viscoelastic surfactant to increase the viscosity of the well fluid by more than 10 cP.

4. The well fluid according to claim 1, wherein the well fluid is essentially free of the viscoelastic surfactant.

5. The well fluid according to claim 1, wherein the well fluid contains less than 0.01% by weight of the water of a viscoelastic surfactant.

6. The well fluid according to claim 1, wherein the continuous water phase comprises a source of water selected from the group consisting of freshwater, seawater, brine, or any combination thereof.

7. The well fluid according to claim 1, wherein the well fluid additionally comprises a weighting agent.

8. The well fluid according to claim 7, wherein the weighting agent is in at least a sufficient concentration such that the continuous water phase has a density of at least 9 ppg.

9. The well fluid according to claim 7, wherein the weighting agent comprises a water-soluble inorganic salt.

10. The well fluid according to claim 7, wherein the weighting agent comprises barium sulfate.

11. The well fluid according to claim 7, wherein the weighting agent is a solid particulate selected from the group consisting of: hematite, calcium carbonate, and any combination thereof.

12. The well fluid according to claim 7, wherein the weighting agent is a solid particulate having a particle size distribution anywhere in the range of 400 US mesh to 100 US mesh.

13. The well fluid according to claim 1, wherein the well fluid includes less than 10% of any combination of dissolved alkali metal halide salts by weight of the water.

14. The well fluid according to claim 1, wherein the viscosity increasing agent comprises a cellulosic polymer, a polyacrylic polymer, or natural gum polymer.

15. The well fluid according to claim 1, wherein the fluid-loss control agent is selected from the group consisting of: bentonite particulate, an organic colloidal-sized solid particulate; a filter cake bridging material, a lost-circulation particulate, and any combination thereof; and wherein the fluid-loss control agent does not comprise a hydrophobically modified hydrophilic polymer.

16. The well fluid according to claim 1, wherein the fluid-loss control agent is a particulate selected from the group consisting of bentonite, a biopolymer, cellulose polymer, modified cellulose, starch, modified starch, polyanionic cellulose, plant tannin, a polyphosphate, a lignitic material, a lignosulfonate, a synthetic polymer, calcium carbonate, asphalt, gilsonite, walnut shells, and mica; and wherein the fluid-loss control agent does not include a hydrophobically-modified hydrophilic polymer.

17. The well fluid according to claim 1, wherein the fluid-loss control agent is selected from the group consisting of polyanionic cellulose, modified starch, and any combination thereof in any proportion; and wherein the fluid-loss control agent does not comprise a hydrophobically modified hydrophilic polymer.

18. The well fluid according to claim 1, wherein the fluid-loss control agent is in a concentration of at least 1 ppg of the continuous water phase.

19. The well fluid according to claim 1, wherein the cyclodextrin-based compound is a cyclodextrin.

* * * * *